(12) United States Patent
Neugebauer et al.

(10) Patent No.: US 10,961,057 B2
(45) Date of Patent: Mar. 30, 2021

(54) SEPARATING DEVICE, TRACTION MECHANISM WITH AT LEAST ONE SEPARATING DEVICE, TRANSPORT SYSTEM AND METHOD FOR SEPARATING AND DRIVING AT LEAST ONE LOAD CARRIER

(71) Applicant: BEUMER Group GmbH & Co. KG, Beckum (DE)

(72) Inventors: Jürgen Neugebauer, Semriach (DE); Nicolas Sandor, Edelschrott (DE)

(73) Assignee: BEUMER Group GmbH & Co. KG, Beckum (DE)

( * ) Notice: Subject to any disclaimer, the term of this patent is extended or adjusted under 35 U.S.C. 154(b) by 0 days.

(21) Appl. No.: 16/895,838

(22) Filed: Jun. 8, 2020

(65) Prior Publication Data
US 2020/0391951 A1   Dec. 17, 2020

(51) Int. Cl.
  *B65G 19/02* (2006.01)
  *B65G 17/42* (2006.01)
  *B65G 23/16* (2006.01)
  *B65G 47/28* (2006.01)

(52) U.S. Cl.
  CPC .......... *B65G 19/025* (2013.01); *B65G 17/42* (2013.01); *B65G 23/16* (2013.01); *B65G 47/28* (2013.01); *B65G 2207/38* (2013.01)

(58) Field of Classification Search
  CPC ...... B65G 17/20; B65G 17/42; B65G 19/025; B65G 23/16; B65G 47/28; B65G 2207/38
  See application file for complete search history.

(56) References Cited

U.S. PATENT DOCUMENTS

| 3,835,786 | A | * | 9/1974 | McIllwain | B65G 19/025 104/172.4 |
| 5,437,231 | A | * | 8/1995 | Janzen | B61B 10/025 104/162 |
| 6,367,612 | B1 | * | 4/2002 | Dosso | B61B 10/025 104/172.1 |

(Continued)

FOREIGN PATENT DOCUMENTS

| CN | 208731942 | 4/2019 |
| DE | 69504972 | 2/1999 |

(Continued)

OTHER PUBLICATIONS

Extended European Search Report in European Application No. 20179468.2, dated Nov. 2, 2020, 11 pages.

*Primary Examiner* — Gene O Crawford
*Assistant Examiner* — Keith R Campbell
(74) *Attorney, Agent, or Firm* — Ganz Pollard, LLC

(57) ABSTRACT

A separating device for the separation of at least one load carrier from a further load carrier. The separating device comprises a driver element for arranging on a traction mechanism of a transport system, the driver element having a fastening section for fastening the driver element to the traction mechanism and a driving section for driving at least one load carrier. The driver element can be transferred at least in sections from a driving position into a release position. Furthermore, the invention relates to a traction mechanism with the separating device, to a transport system, and to a method for separating and driving at least one load carrier.

12 Claims, 4 Drawing Sheets

(56) References Cited

U.S. PATENT DOCUMENTS

| | | | | |
|---|---|---|---|---|
| 8,808,067 | B2* | 8/2014 | Waldstadt | A22C 11/00 452/51 |
| 9,205,990 | B2* | 12/2015 | Otto | B65G 19/025 |
| 9,931,722 | B2* | 4/2018 | Guhl | B65G 19/025 |
| 10,046,914 | B1* | 8/2018 | Otto | B65G 17/20 |
| 2015/0239671 | A1* | 8/2015 | Wend | B65G 17/20 198/347.1 |

FOREIGN PATENT DOCUMENTS

| | | |
|---|---|---|
| DE | 20103664 | 6/2001 |
| EP | 2886494 | 6/2015 |
| EP | 2910499 | 8/2015 |
| EP | 2921434 | 9/2015 |

\* cited by examiner

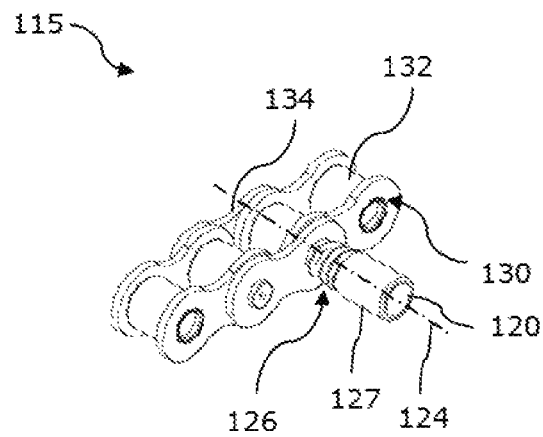
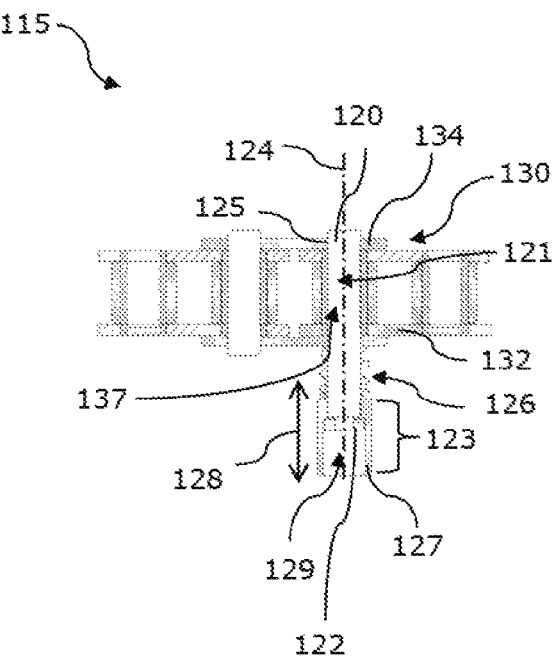
FIG 4
FIG 5
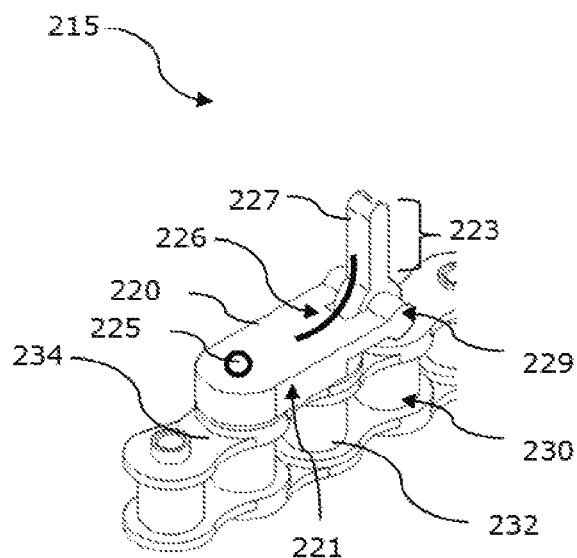
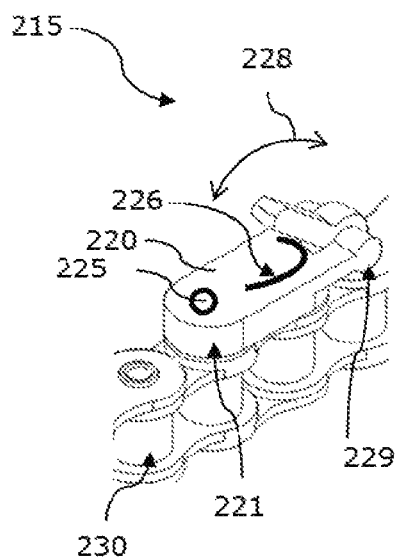
FIG 6
FIG 7

SEPARATING DEVICE, TRACTION MECHANISM WITH AT LEAST ONE SEPARATING DEVICE, TRANSPORT SYSTEM AND METHOD FOR SEPARATING AND DRIVING AT LEAST ONE LOAD CARRIER

BACKGROUND

A separating device for the separation of at least one load carrier from a further load carrier. The separating device comprises a driver element for arranging on a traction mechanism of a transport system, the driver element having a fastening section for fastening the driver element to the traction mechanism and a driving section for driving at least one load carrier. The driver element can be transferred at least in sections from a driving position into a release position. Furthermore, the invention relates to a traction mechanism with the separating device, to a transport system, and to a method for separating and driving at least one load carrier.

In order to ensure rapid and reliable goods transport, different goods are typically collected in a logistics centre and are typically supplied there with the aid of a transport system to different allocation points in the logistics centre. Here, the goods are put into load carrier containers, such as hanging pouches, which are coupled to load carriers and are subsequently transported along a course in the transport system from allocation point to allocation point. In order for it to be possible for transport which is as cost-efficient as possible to be provided in the transport system, the load carriers are conveyed closely to one another. It is particularly important here that interruption-free transporting of the load carriers is ensured. The course is typically monitored at various course points, in order for it to be possible for action to be taken as rapidly as possible in the case of a transport interruption. The monitoring of the transport systems is typically associated with an expensive sensor system, or else cameras, and/or with high staff costs. The load carriers which are conveyed closely to one another have to be separated at least at individual allocation points. The separation of the load carriers is typically carried out by way of a separating device which is arranged in the transport system. Here, the transport speed is typically reduced and/or the transport throughput in the transport system is reduced.

EP 2 910 499 A1 discloses a transport system for transporting hanging articles with a transport device and with a separating device. The transport device has a conveyor chain as transport means, on which conveyor chain the separating device is arranged with a plurality of separating means for separating and driving load carriers. The conveyor chain therefore conducts the separating means to the load carriers and separates the plurality of load carriers which are subsequently driven by said separating means.

It is a disadvantage of the said solution that the plurality of separating means are arranged in a stationary manner on the separating device and therefore have to be adapted mechanically to the load carriers in the transport system with regard to their overall size, in order for it to be possible for a collision and therefore an undesired downtime in the transport system to be avoided.

SUMMARY

It is the object of the present invention to eliminate one or more disadvantages of the prior art. In particular, a separating device is to be provided which has a simple construction and ensures reliable separating and driving of load carriers with the aid of the transport device without disruption. Furthermore, a traction mechanism is to be provided as transport device which ensures the transporting reliability in a transport system with a plurality of load carriers, and a transport means is to be provided which can be operated without malfunctions. In addition, a method for separating and driving at least one load carrier is to be provided, by way of which method malfunction-free operating of a transport system is made possible.

At least individual objects of the said objects are achieved by way of the devices and methods which are defined in the independent patent claims. Advantageous developments are shown in the figures, the description and, in particular, in the dependent patent claims.

A separating device according to the invention for the separation of at least one load carrier from a further load carrier comprises at least one driver element for arranging on a traction mechanism of a transport system, the at least one driver element having a fastening section for fastening the at least one driver element to the traction mechanism and a driving section for driving at least one load carrier. The at least one driver element can be transferred at least in sections from a driving position into a release position.

In the case of the at least one driver element being guided up to the at least one load carrier, the at least one driver element can make contact with the at least one load carrier and can subsequently separate it, it being possible for the at least one load carrier to subsequently be driven along a traction mechanism course of the traction mechanism. In order for it to be possible for an undesired collision to be prevented between the at least one driver element and the at least one load carrier, the at least one driver element can be transferred at least in sections from a driving position into a release position. Here, in the present case, the driving position defines that position, in which the at least one driver element can freely drive the at least one load carrier along a traction mechanism course. Here, in the present case, the release position is that position, in which the at least one driver element cannot drive the at least one load carrier along a traction mechanism course. If the at least one driver element is situated in the release position, it can be guided past the at least one load carrier without completely gripping and driving the latter. The at least one driver element can subsequently be transferred at least in sections from the release position into the driving position. The separating device therefore ensures a malfunction-free operation of a transport system, since, in the case of separating of the at least one load carrier from the further load carrier, a collision which leads to a positively locking connection between the at least one driver element and one of the two load carriers can be prevented. Here, the separating device is part of the traction mechanism in the transport system, with the result that a separate separating device can be saved.

The at least one driver element is advantageously arranged on the traction mechanism with the aid of a fastening means, with the result that the at least one driver element at least cannot be separated in an independent manner Therefore, an undesired detachment of the at least one driver element from the separating device can be prevented. For example, the fastening means is a securing ring or a securing splint, a screw, a rivet, a bolt, an adhesive or the like.

As an alternative or in addition, the at least one driver element is arranged movably on the traction mechanism or is connected to the traction mechanism with the aid of a cold working method, such as cold pressing or other methods. In this way, the separation of the at least one driver element from the traction mechanism can be prevented.

There is preferably at least one transfer device for the transfer at least in sections of the at least one driver element at least from the release position into the driving position. By way of the transfer device, the at least one driver element can therefore be transferred simply from the release position back into the driving position.

The at least one transfer device is advantageously arranged between the fastening section and the driving section of the at least one driver element. In this way, a transfer device can be provided which is arranged in a space-saving manner on the at least one driver element of the separating device.

The at least one transfer device advantageously comes from the group of a joint device, a spring device or a magnet device. Here, a spring device can comprise at least one helical spring or one spiral spring or at least one leaf spring. Here, the spring force of the spring device is advantageously dimensioned in such a way that at least the transport weight of the at least one load carrier can be overcome and therefore the at least one load carrier can be driven without malfunctions. If the at least one transfer device comprises a joint device, the said transfer device can advantageously be coupled to a spring device, for example to a leaf spring. Before a collision which leads to a positively locking connection between the at least one driver element and the at least one load carrier occurs, the spring force of the spring device is overcome here by the at least one load carrier in such a way that the joint device yields at least in sections and releases the at least one load carrier. A magnet device as at least one transfer device makes contact-free or simple separating of the at least one load carrier from the further load carrier possible. Here, for example, the at least one driver element is configured from a magnetizable or magnetic material.

It is preferably provided that, in the driving position, the at least one driver element is prevented from a movement counter to a driving direction, in which the traction mechanism can be moved in order to drive a load carrier. This can preferably be realized, in particular, by virtue of the fact that the at least one driver element can be moved from the driving position into the release position in a rectilinear manner in a direction which runs transversely with respect to a driving direction, in which the traction mechanism can be moved in order to drive a load carrier.

As a result, the driver element preferably has exclusively a movement capability transversely with respect to the driving direction, which movement capability enables the driver element to move between the driving position and the release position, a movement counter to the driving direction not being possible, however, with the result that even considerable driver forces can be transmitted as required.

The at least one driver element preferably has a driver pin which is arranged on the at least one driver element. The driver pin can be arranged in the driving section of the at least one driver element. The driver pin is configured to make contact with the at least one load carrier when the latter is guided up to it, and to drive the load carrier after the separation of the latter. The driver pin can be configured to be spherical, cylindrical, cuboid, wedge-shaped or the like.

The driver pin can advantageously be transferred from the driving position into the release position. Here, the at least one driver element can be arranged on the separating device in a static manner. In the driving position, the driver pin drives the at least one load carrier, whereas, in its release position, the driver pin can be guided past the at least one load carrier and therefore releases the latter. Subsequently, the driver pin can be transferred from the release position into the driving position. The driver pin of the separating device therefore ensures malfunction-free operating of a transport system, since, in the case of separating of the at least one load carrier from the further load carrier, a collision which leads to a positively locking connection between the driver pin and one of the two load carriers can be prevented.

The at least one driver element advantageously has a driver piston element which secures the driver pin on the at least one driver element. Here, the diameter of the driver piston element can be greater than the diameter of the at least one driver element, with the result that a separation of the driver pin can be prevented.

In particular, the driver pin can be transferred from the driving position into the release position together with the at least one driver element. In this way, the abovementioned functions and/or advantages are improved further, and undesired driving of more than one load carrier can be prevented.

The at least one transfer device can preferably be displaced relative to the at least one driver element at least in sections along a longitudinal axis of the at least one driver element. The at least one transfer device is situated in the driving position of the at least one driver element in its starting position or in its starting form. The at least one transfer device can be configured to change its starting form or starting position at least in sections in the case of the transfer of the at least one driver element from the release position into the driving position. Here, for example, a helical spring is compressed, or a leaf spring is bent.

The at least one driver element can advantageously be transferred along the said longitudinal axis from the driving position into the release position, as a result of which a compact and stable separating device is provided which ensures a high service life of the transport system.

As an alternative or in addition, the driver pin can be displaced relative to the at least one driver element at least in sections along a longitudinal axis of the at least one driver element. For this purpose, the at least one transfer device can be configured to change its starting form or starting position at least in sections in the case of the transfer of the at least one driver pin from the release position into the driving position. In this way, a particularly space-saving separating device can be implemented in a transport system.

It is preferably provided that the longitudinal axis is arranged transversely with respect to a driving direction, in which the traction mechanism can be moved in order to drive a load carrier. This ensures, as has already been described, that the driver element is prevented from moving counter to the driving direction in the driving position, and ensures that a movement into the release position cannot already take place by virtue of the fact that a driving force which acts counter to the driving direction occurs as a result of contact of the driver element with a load carrier.

The at least one transfer device is preferably configured to hold the at least one driver element in the driving position during the driving of a load carrier. In this way, particularly stable driving of the at least one load carrier is possible. For example, in the case of the use of a spring device as at least one transfer device, the at least one driver element is arranged on the separating device such that it can be prestressed.

As an alternative or in addition, the at least one transfer device is configured to hold the driver pin in the driving position during the driving of a load carrier. As a result, a cancellation of the driving contact with the at least one load carrier can be prevented.

In particular, the at least one transfer device is connected to a drive device which is configured to transfer the at least one driver element and/or the driver pin of the at least one driver element from the driving position into the release position and back again into the driving position. In this way, the at least one driver element and/or the driver pin of the at least one driver element can be transferred in a simple and controlled manner. For example, the drive device comprises a pneumatic drive which transfers the at least one driver element and/or the driver pin of the at least one driver element from the driving position into the release position and back again into the driving position. As an alternative, the drive device comprises an electric drive. In this way, the at least one driver element and/or the driver pin of the at least one driver element can be transferred in a reproducible and controlled manner.

A traction mechanism according to the invention with a plurality of traction mechanism elements comprises at least one separating device as described here in the present case. Here, the traction mechanism can be configured as a conveyor chain, the traction mechanism elements being chain links. The traction mechanism can be moved along a traction mechanism course with the aid of a separate drive device. For example, the said drive device is driven by a motor. In this way, a transport device is provided in a transport system, which transport device, in addition to the transporting of the at least one load carrier along the traction mechanism course or along the conveyor chain course, also makes the separation of at least one load carrier from a further load carrier possible. A separate separating device in the transport system can be dispensed with.

The at least one driver element is advantageously arranged in a through opening on the traction mechanism elements. In this way, the at least one driver element can be connected to the traction mechanism in a stable manner.

It is further advantageously possible for the at least one driver element to be transferred from the driving position into the release position along a longitudinal axis of the at least one driver element. For example, the traction mechanism is configured as a hollow pin chain, with the result that the at least one driver element is simply arranged movably in the hollow pin of the traction mechanism, with the result that the construction of the traction mechanism itself can be of simple and/or standard configuration.

The at least one driver element is advantageously configured to connect at least two traction mechanism elements of the traction mechanism to one another. In this way, the traction mechanism elements can be connected to one another in a stable manner, and the number of elements of the traction mechanism can be reduced. For example, the first traction mechanism element and the second traction mechanism element in each case have a through opening, in which the at least one driver element is arranged. The traction mechanism elements can advantageously be rotated around the at least one driver element in an embodiment of this type.

The at least one driver element is advantageously arranged such that it can be moved along the through openings of the two traction mechanism elements. In this way, a particularly simple transfer of the at least one driver element from the driving position into the release position is possible.

The traction mechanism preferably has a plurality of separating devices which are as described here in the present case. In this way, a plurality of load carriers can be driven along the traction mechanism course in a separated and individual manner.

In particular, a plurality of driver elements are configured to connect at least two traction mechanism elements of the traction mechanism to one another, as a result of which the stability of the traction mechanism is improved further.

A transport system according to the invention for the transport of load carriers, with a transport course profile for receiving and guiding a plurality of load carriers comprises at least one traction mechanism as described here in the present case. Here, the traction mechanism has at least one separating device as described here in the present case. Here, the plurality of load carriers can be arranged on the transport course profile such that they can be moved freely along the transport course profile, at least one load carrier being separated and driven by the at least one driver element. The transport system does not require a separate separating device. As a result, a high transport throughput (number of transported load carriers per unit time) is possible at a simultaneously very low traction mechanism speed or conveying speed along the traction mechanism course. The low conveying speed makes low-noise and energy-efficient operating of the transport system possible.

In particular, the transport system is configured as an inclined conveying system. Along the traction mechanism course, an inclined conveying system has an upward slope at least in sections or a downward slope at least in sections which are overcome by the at least one load carrier. An inclined conveying system with a traction mechanism as described here in the present case and with at least one separating device as described here in the present case makes transport of the load carriers possible along an upward slope course or a downward slope course which run at up to 90° in relation to the horizontal. In addition to the abovementioned advantages, an increased height difference with a low base area requirement can be overcome with the aid of the said inclined conveying system.

The at least one separating device can preferably be guided up to the transport course profile along the traction mechanism course. Here, an improved introduction of separating force from the at least one driver element to the at least one load carrier is possible, as a result of which a collision which leads to a positively locking connection between the at least one driver element and the at least one load carrier can be ruled out.

The at least one separating device of the traction mechanism is advantageously configured to drive at least one of the load carriers in at least one traction mechanism course region. In this way, an expensive sensor system for monitoring the transport system in the said traction mechanism course region can be dispensed with.

The traction mechanism preferably runs through a track curve in the region of the transport course profile. Here, the at least one separating device can be guided up to the transport course profile on the traction mechanism along a defined track curve. In the case of guiding it up to the said transport course profile, the spacing of the at least one separating device from the transport course profile decreases in size until the at least one driver element can separate and subsequently drive the at least one load carrier. In this way, the introduction of separating force and the introduction of driving force to the at least one load carrier are improved further.

A method according to the invention for separating and driving at least one load carrier with a first separating device and with at least one further separating device on a transport system comprises the following steps:

First of all, guiding of the first separating device up to the at least one load carrier takes place. After the guiding of the first separating device up to the said at least one load carrier, the at least one driver element of the first separating device makes contact with at least one load carrier in the transport system. Here, the at least one driver element of the first separating device is advantageously situated in its driving position, in which the at least one load carrier can be driven by the at least one driver element.

If the driving of the at least one load carrier by way of the at least one driver element of the first separating device is not possible, the transferring of the at least one driver element of the first separating device from the driving position into the release position takes place with the aid of the at least one load carrier. Subsequently, the at least one driver element of the first separating device can be guided past the at least one load carrier.

Subsequently, the separating of the at least one load carrier from the further load carrier takes place by way of the at least one driving element of the first separating device.

In this way, a collision which leads to a positively locking connection between the at least one driver element and the at least one load carrier is prevented in the transport system.

In the case of the separation, the at least one driver element of the first separating device is advantageously transferred from the release position into the driving position. Here, the load carrier is guided to the driving element of the following further separating device in a separating direction which runs, in particular, counter to the transport direction of the traction mechanism.

Subsequently, the at least one load carrier is driven by the at least one driver element of the at least one further separating device along the traction mechanism course of the traction mechanism. This method therefore ensures malfunction-free operating of a transport system, since an undesired collision is prevented in the case of the separating of the at least one load carrier from the further load carrier. Here, the separating device is part of the traction mechanism in the transport system, with the result that a separate separating device can be saved.

In particular, the method which is described here in the present case is carried out by way of at least one separating device which is described here in the present case, at least one of the separating devices being configured as described above. In particular, the method which is described here in the present case is carried out on a transport system which is described here in the present case.

Further advantages, features and details of the invention result from the following description, in which exemplary embodiments of the invention are described with reference to the drawings.

The list of designations is a constituent part of the disclosure, as are the technical contents of the patent claims and figures. The figures are described in a linked and universal manner Identical designations denote identical components, and designations with different indices indicate functionally identical or similar components.

BRIEF DESCRIPTION OF DRAWINGS

FIG. 4 shows a second embodiment of the separating device according to the invention in a perspective illustration, FIG. 5 shows the separating device according to FIG. 4, the driver pin being situated in the driving position, in a sectional view, FIG. 6 shows a further embodiment of the separating device according to the invention, the driver pin being situated in the driving position, in a perspective illustration, FIG. 7 shows the separating device according to FIG. 6, the driver pin being situated in the release position, in a perspective illustration.

DETAILED DESCRIPTION

Figure 1:
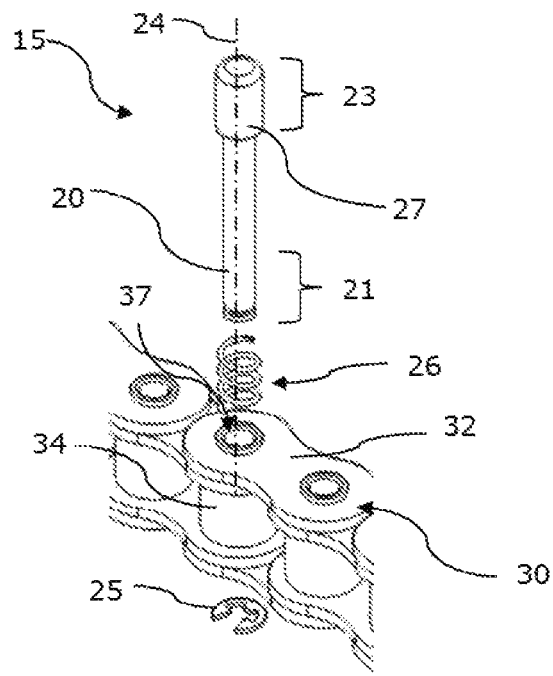
FIG. 1 shows a first embodiment of a separating device according to the invention in a perspective illustration.
Figure 2:
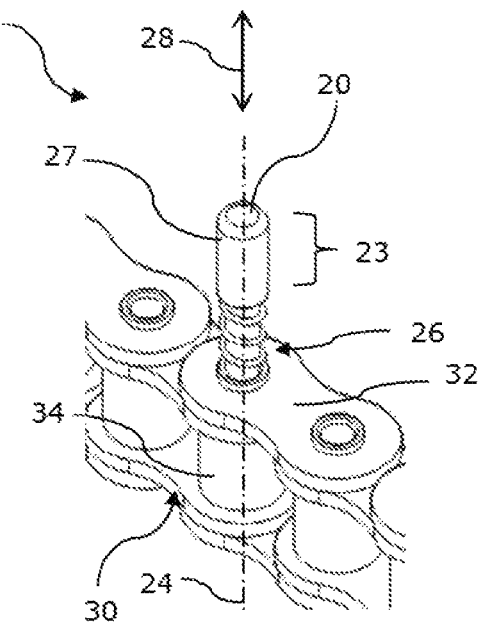
FIG. 2 shows the separating device according to FIG. 1, the at least one driver element being situated in the driving position, in a perspective illustration.
Figure 3:
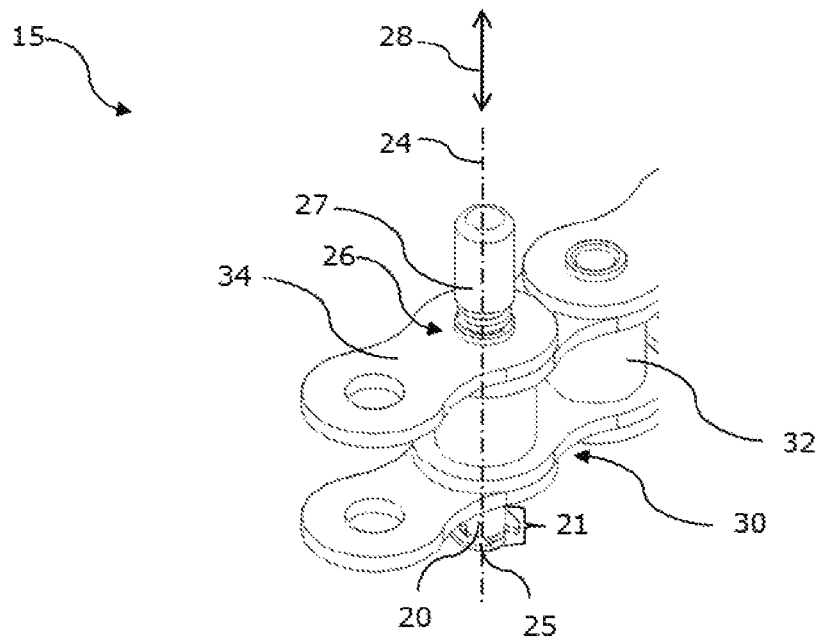
FIG. 3 shows the separating device according to FIG. 1, the at least one driver element being situated in the release position, in a perspective illustration.

FIGS. 1 to 3 show a first embodiment of a separating device for the separation of a load carrier from a further load carrier. The said separating device 15 comprises a driver element 20 for arranging on a traction mechanism 30 of a transport system. The driver element 20 has a fastening section 21 for fastening the driver element 20 to the traction mechanism 30, and a driving section 23 for driving at least one load carrier. The driver element 20 has a driver pin 27 which is arranged on the driving section 23 and which comes into contact with the load carrier in the case of the driving of the latter.

A transfer device 26 is arranged between the fastening section 21 and the driving section 23. The driver element 20 and the driver pin 27 are configured in one piece and in a bolt-shaped manner. The transfer device 26 is configured as a helical spring, and can transfer the driver element 20 from a release position into a driving position.

FIG. 2 shows the driver element 20 in its driving position, the helical spring which is configured as a transfer device 26 pressing against the driver pin 27 of the driver element 20 and prestressing the driver element 20. FIG. 3 shows the driver element 20 in its release position, the helical spring which is configured as a transfer device 26 being shown in a compressed state, and the driver element 20 protruding with the fastening section 21 at least in sections out of the traction mechanism 30. The driver element 20 which can be transferred is arranged in the through opening 37 on the traction mechanism elements 32 and 34, and can be transferred or moved in the latter along the longitudinal axis 24 of the driver element 20 and in the transfer directions 28.

The transfer of the driver element 20 from the driving position into the release position takes place with the aid of the load carrier if the load carrier presses on the driver pin 27 in the transfer direction 28 along the longitudinal axis 24 of the driver element 20. The driver element 20 is held in the through opening 37 with the aid of the fastening means 25. The fastening means 25 which is shown is a securing ring.

FIGS. 4 and 5 show an alternative embodiment of the separating device for separating a load carrier from a further load carrier. The separating device 115 comprises a driver element 120 for arranging on a traction mechanism 130 of a transport system. The driver element 120 has a fastening section 121 for fastening the driver element 120 to the traction mechanism 130, and a driving section 123 for driving at least one load carrier. The driver element 120 is fixed in the through opening 137 on the traction mechanism elements 132 and 134, the driver element 120 being cold worked with the fastening means 125.

The driver element 120 has a driver pin 127 which is arranged on the driving section 123 and which comes into contact with a load carrier in the case of driving of the latter. The driver element 120 is of bolt-shaped configuration.

A transfer device 126 is arranged between the fastening section 121 and the driving section 123. The transfer device 126 is configured as a helical spring, and can move the driver pin 127 relative to the driver element 220 and can therefore transfer the driver pin 127 from the release position into the driving position. The driver pin 127 is configured as a cylinder sleeve. The driver element 120 has a driver piston element 122 on the driving section 123. The driver pin 127 has a driver pin opening 129 which receives the driver piston element 122 of the driver element 120 at least in regions. The driver piston element 122 can be moved and/or transferred therein along the longitudinal axis 124 of the driver element 120 and in the transfer directions 128. The driver pin 127 can therefore be transferred and/or moved along the longitudinal axis 124 of the driver element 120 and in the transfer directions 128.

FIG. 4 shows the driver element 120 in its driving position, the helical spring which is configured as a transfer device 126 pressing against the driver pin 127 of the driver element 120 and prestressing the driver pin 127. In the release position of the driver pin 127, the helical spring which is configured as a transfer device 26 is compressed, the driving section 123 of the driver element 120 penetrating further into the driver pin opening 129 and therefore decreasing the spacing of the driver pin 127 from the traction mechanism 130 (not shown).

FIG. 6 and FIG. 7 show an alternative embodiment of the separating device for the separation of a load carrier from a further load carrier. The separating device 215 comprises a driver element 220 for arranging on a traction mechanism 230 of a transport system. The driver element 220 has a fastening section 221 for fastening the driver element 220 to the traction mechanism 230, and a driving section 223 for driving at least one load carrier. A screw is arranged as fastening means 225 on the fastening section 221, which screw therefore fastens the driver element 220 to the traction mechanism 230.

The driver element 220 has a driver pin 227 which is arranged on the driving section 223 with the aid of a joint 229, and which comes into contact with a load carrier in the case of driving of the latter. The driver pin 227 is of cuboid configuration. A transfer device 226 is arranged between the fastening section 221 and the driving section 223. The transfer device 226 is configured as a leaf spring, and can transfer the driver pin 227 from the release position into the driving position. The driver pin 127 can be transferred and/or pivoted in the transfer direction 228 with the aid of the joint 229.

FIG. 6 shows the driver pin 227 in its driving position, the leaf spring which is configured as a transfer device 226 pressing against the driver pin 227 of the driver element 220 and prestressing the driver pin 227 or holding it in the driving position. FIG. 7 shows the driver pin 227 in its release position, the leaf spring which is configured as a transfer device 226 being shown in a compressed or bent-together state, and the driver pin 227 having approached the fastening section 221 at least in sections.

In one embodiment which is not shown here, the transfer device is provided with a drive which is configured to transfer the driver element and/or the driver pin from the driving position into the release position and back again into the driving position. The said transfer device can be used in each of the abovementioned embodiments of the separating devices.

Figure 8:
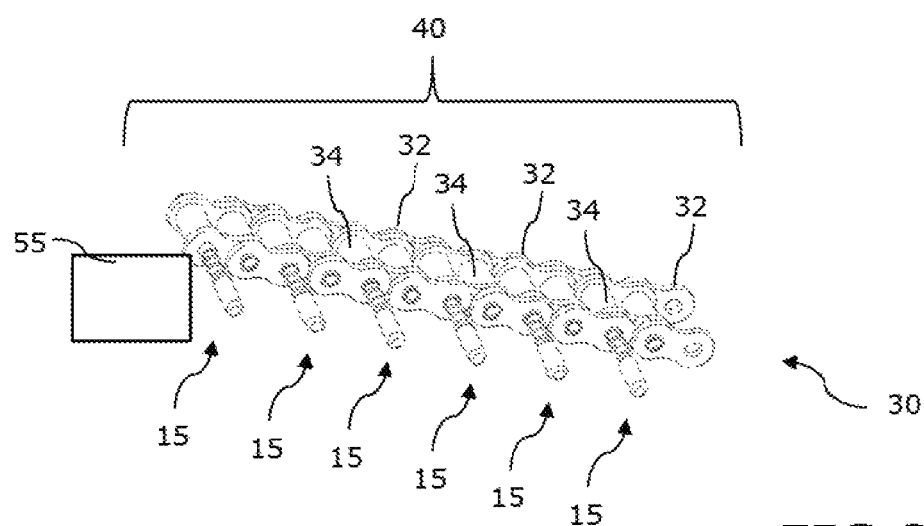
FIG. 8 shows a traction mechanism according to the invention with a plurality of separating devices according to FIG. 2 in a perspective illustration.
Figure 9:
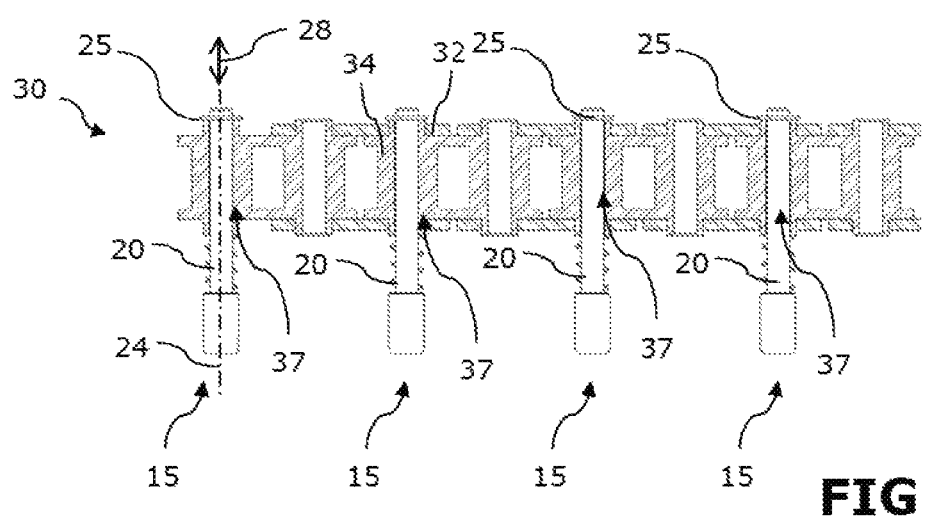
FIG. 9 shows the traction mechanism according to FIG. 8 with a plurality of separating devices according to FIG. 2 in a sectional view.

FIG. 8 and FIG. 9 show a conveyor chain as a traction mechanism 30 which has a plurality of separating devices 15 according to FIG. 1 to FIG. 3. In addition or as an alternative, separating devices 115 and/or 215 according to FIG. 4 and FIG. 5 and/or according to FIGS. 6 and 7 can also be arranged on the said traction mechanism 30. The traction mechanism 30 has a plurality of chain links as traction mechanism elements 32, 34. The traction mechanism 30 can be moved along the traction mechanism course 40 with the aid of a drive device 55. The drive device 55 is driven by a motor.

Each driver element 20 of the plurality of separating devices 15 is arranged in a through opening 37 on at least two traction mechanism elements 32, 34 of the traction mechanism 30, the driver elements 20 being arranged such that they can be displaced or moved along the longitudinal axis 24 in the through openings 37 on the traction mechanism elements 32, 34 in the transfer direction 28 (FIG. 9). Each of the driver elements 20 is held movably on the traction mechanism 30 by way of a fastening means 25 which is configured as a securing ring. Without the fastening means 25, the driver elements 20 can be separated from the traction mechanism 30.

Figure 10:
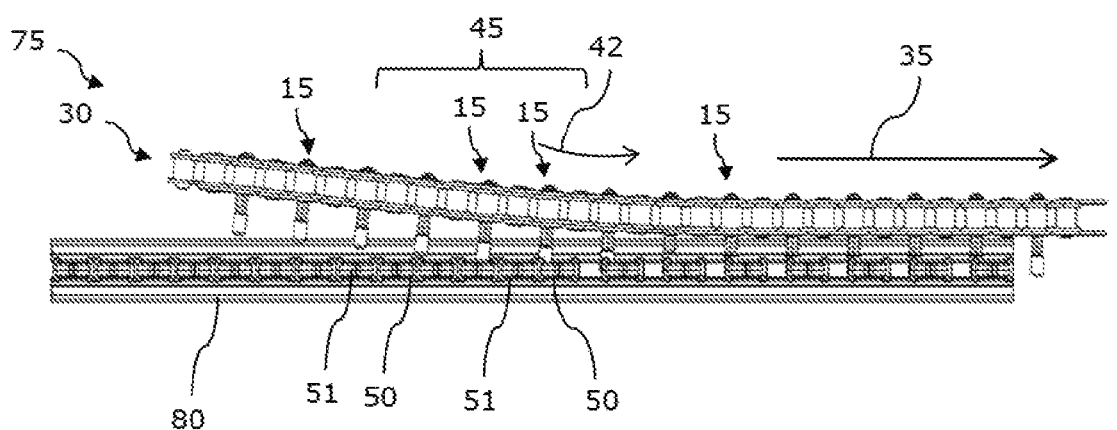
FIG. 10 shows a transport system according to the invention with a traction mechanism according to FIG. 8 in a plan view.
Figure 11:
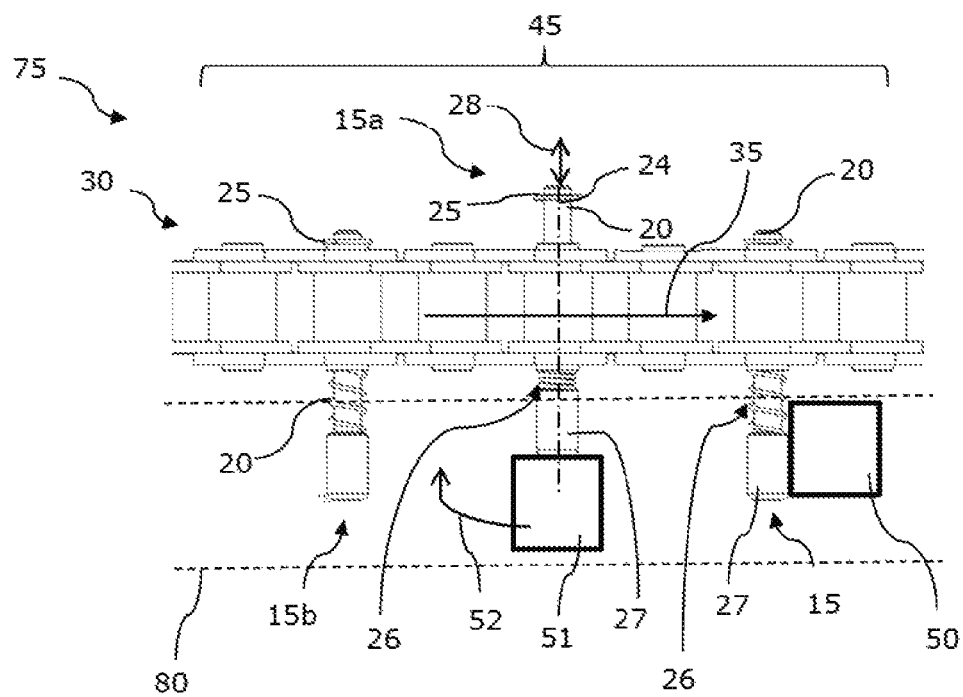
FIG. 11 shows the transport system according to FIG. 10 with a plurality of separating devices according to FIG. 2 and according to FIG. 3 in a side view.

FIG. 10 and FIG. 11 show a transport system 75 for the transport of load carriers 50, 51 by way of the traction mechanism 30 according to FIG. 8 and FIG. 9. The transport system 75 has a transport course profile 80 for receiving and guiding the plurality of load carriers 50, 51. The load carriers 50, 51 are arranged on the transport course profile 80 such that they are packed tightly against one another, and can move freely on the transport course profile 80 in the transport direction 35. The traction mechanism 30 and the separating devices 15 which are arranged thereon can be guided up to the transport course profile 80 along the transport mechanism course 40 and along a track curve 42 in the transport direction 35.

In the case of being guided up to it, the traction mechanism 30 approaches the transport course profile 80 along the track curve 42, with the result that the spacing between the traction mechanism 30 and the transport course profile 80 decreases along the traction mechanism course 40, until the traction mechanism 30 runs substantially parallel to the transport course profile 80. Subsequently, the traction mechanism 30 moves parallel to the transport course profile 80. Here, the driver element 20 of one of the separating devices 15 makes contact in a traction mechanism course region 45 with one of the load carriers 50, 51, separates the latter and drives it along the traction mechanism course 40.

As shown in FIG. 11, the driver pin 27 of the driver element 20 of one of the separating devices 15 drives the load carrier 50 in the traction mechanism course region 45. Here, the driver element 20 is situated in the driving position and is held in the driving position by the transfer device 26 which is configured as a helical spring. The load carrier 50 is guided on the transport course profile 80, and is separated and driven by the driver element 20 along the transport direction 35.

In the case where the driving of the load carrier 51 by way of the driver element 20 of the first separating device 15a is not possible, the transfer of the driver element 20 of the first separating device 15a from the driving position into the release position takes place as described here in the present case (see FIG. 2 and FIG. 3). Here, the transfer device 26 which is configured as a helical spring is compressed.

The transfer of the driver element 20 takes place with the aid of the load carrier 51 which presses in transfer directions 28 on the driver pin 27 of the driver element 20, with the result that the driver element 20 is transferred or moved in the transfer directions 28. Since the traction mechanism 30 is subsequently moved further along the transport direction 35, the driver element 20 of the first separating device 15a is guided past the said load carrier 50.

Subsequently, the driver element 20 of the first separating device 15a is transferred from the release position into the driving position with the aid of the transfer device 26 which is configured as a helical spring. Here, the load carrier 51 is guided in the separating direction 52 to the driving element 20 of the following further separating device 15b, with the result that the separation of the load carrier 50 from the further load carrier 51 takes place. Here, the load carrier 51 remains stationary temporarily, the driver element 20 moving further in the transport direction 35.

The load carrier 51 is subsequently driven by the driver element 20 of the further separating device 15b along the traction mechanism course 40 of the traction mechanism 30.

The above-described method can likewise be carried out by way of the separating device 115 on the traction mechanism 130 according to FIG. 4 and FIG. 5 and by way of the separating device 215 on the traction mechanism 230 according to FIG. 6 and FIG. 7, the respective driver pin 127 and 227 being transferred, as described above, by the load carrier 51 into its release position.

Figure 12:
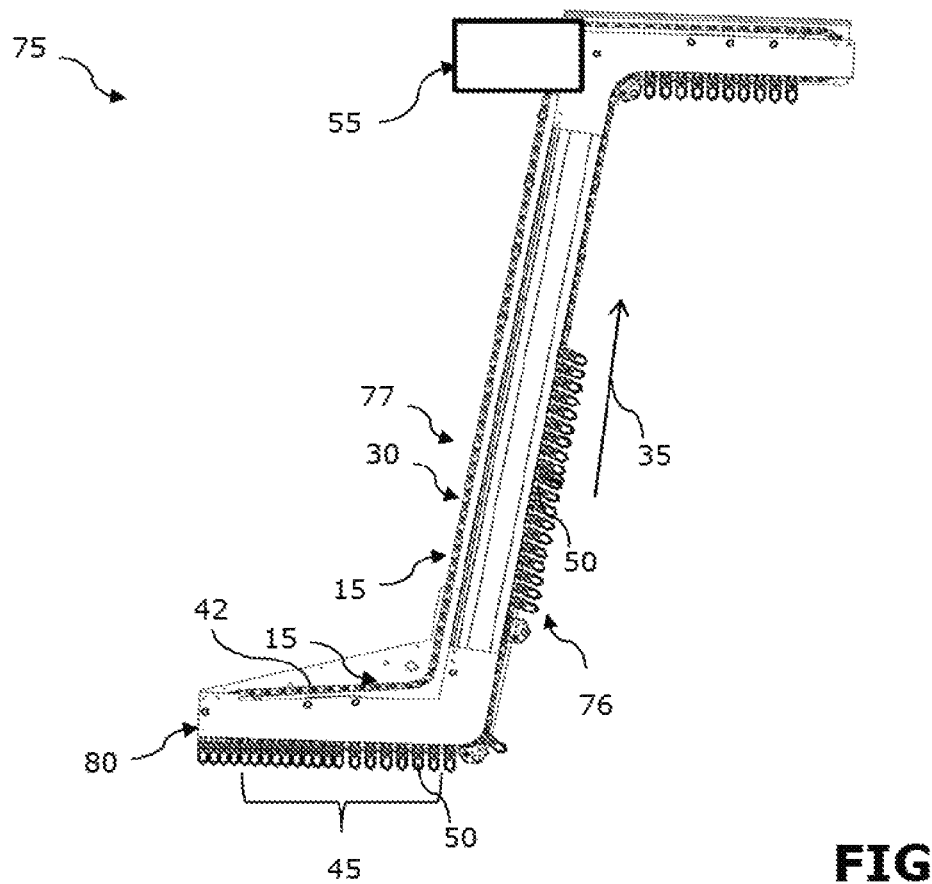
FIG. 12 shows the transport system according to FIG. 11 configured as an inclined conveyor in a perspective illustration.

FIG. 12 shows the above-described transport system 75 as an inclined conveyor system. The inclined conveyor system has a traction mechanism 30 which is self-contained, and has an upward slope 76 at least in sections and a downward slope 77 at least in sections along the traction mechanism course 40. The load carriers 50 are transported along the transport direction 35 with the aid of the traction mechanism 30 and the separating devices 15 which are arranged thereon, and in the process overcome the upward slope 76 in a controlled manner. If the transport direction 35 of the traction mechanism 30 is reversed, the load carriers 50 overcome the upward slope 76 which then configures a downward slope for the load carriers 50 (not shown). The traction mechanism 30 is set in motion with the aid of the drive device 55. Here, as described in the present case here, the load carriers 50 are separated in the traction mechanism course region 45, the traction mechanism 30 being brought closer to the transport course profile 80 along a track curve 42.

We claim:

1. A traction mechanism with a plurality of traction mechanism elements comprising a conveyor chain, the traction mechanism further comprising:
at least one separating device comprising at least one driver element for arranging on the traction mechanism of a transport system,
the at least one driver element having a fastening section for fastening the at least one driver element to the traction mechanism and a driving section for driving at least one load carrier, wherein the at least one driver element can be transferred at least in sections from a driving position into a release position, the at least one driver element being arranged in a through opening on the traction mechanism elements, and
at least one driver element being transferable from the driving position into the release position along a longitudinal axis of the at least one driver element.

2. The separating device according to claim 1, further comprising at least one transfer device for the transfer at least in sections of the at least one driver element at least from the release position into the driving position, the at least one transfer device is arranged between the fastening section and the driving section of the at least one driver element, and which further comes from the group of a joint device, a spring device or a magnet device.

3. The separating device according to claim 1, wherein in the driving position, the at least one driver element is prevented from a movement counter to a driving direction, in which the traction mechanism can be moved in order to drive a load carrier.

4. The separating device according to claim 1, wherein the at least one driver element can be moved from the driving position into the release position in a rectilinear manner in a direction which runs transversely with respect to a driving direction, in which the traction mechanism can be moved in order to drive a load carrier.

5. The separating device according to claim 1, wherein the at least one driver element has a driver pin which is arranged on the at least one driver element and can be transferred from the driving position into the release position, the driver pin being transferable from the driving position into the release position, together with the at least one driver element.

6. The separating device according to claim 2, wherein the at least one transfer device can be displaced relative to the at least one driver element at least in sections along a longitudinal axis of the at least one driver element, and/or a driver pin can be displaced relative to the at least one driver element at least in sections along a longitudinal axis of the at least one driver element.

7. The separating device according to claim 6, wherein the longitudinal axis is arranged transversely with respect to a driving direction, in which the traction mechanism can be moved in order to drive a load carrier.

8. The separating device according to claim 2, wherein the at least one transfer device is configured to hold the at least one driver element and/or the driver pin in the driving position during the driving of a load carrier.

9. A transport system for the transport of load carriers, comprising an inclined conveying system, with a transport course profile for receiving and guiding a plurality of load carriers comprising at least one traction mechanism, comprising:
at least one separating device comprising at least one driver element for arranging on the traction mechanism of the transport system,
the at least one driver element having a fastening section for fastening the at least one driver element to the traction mechanism and a driving section for driving at least one load carrier,
wherein the at least one driver element can be transferred at least in sections from a driving position into a release position, the at least one driver element being arranged in a through opening on the traction mechanism elements, and the at least one driver element to be transferred from the driving position into the release position along a longitudinal axis of the at least one driver element.

10. The transport system according to claim 9, wherein the at least one separating device can be guided up to the transport course profile along a traction mechanism course, and the at least one separating device of the traction mechanism is configured to drive at least one of the load carriers in at least one traction mechanism course region.

11. The transport system according to claim 9, wherein the traction mechanism runs through a track curve in the region of the transport course profile.

12. A method for separating and driving at least one load carrier with a first separating device and with at least one further separating device, at least one of the separating devices comprising at least one driver element for arranging on a traction mechanism of a transport system, the at least one driver element having a fastening section for fastening the at least one driver element to the traction mechanism and a driving section for driving at least one load carrier, wherein the at least one driver element can be transferred at least in sections from a driving position into a release position, on a transport system according to claim 10, the method comprising at least the steps:

guiding of the first separating device up to the at least one load carrier;

transferring of the at least one driver element of the first separating device from the driving position into the release position;

separating of the at least one load carrier from a further load carrier by way of the at least one driving element of the first separating device; and driving of the at least one load carrier by way of the at least one driving element of the at least one further separating device.

* * * * *